(12) United States Patent
Komiya et al.

(10) Patent No.: US 8,237,732 B2
(45) Date of Patent: Aug. 7, 2012

(54) COLOR REPRODUCTION SYSTEM, COLOR REPRODUCTION DEVICE, COLOR REPRODUCTION METHOD, AND COMPUTER-READABLE RECORDING MEDIUM RECORDED WITH COLOR REPRODUCTION PROGRAM

(75) Inventors: Yasuhiro Komiya, Hino (JP); Yasuto Ikeda, Tachikawa (JP); Akira Matsushita, Sagamihara (JP); Takuji Horie, Sagamihara (JP)

(73) Assignee: Olympus Corporation, Tokyo (JP)

( * ) Notice: Subject to any disclaimer, the term of this patent is extended or adjusted under 35 U.S.C. 154(b) by 931 days.

(21) Appl. No.: 12/273,757

(22) Filed: Nov. 19, 2008

(65) Prior Publication Data

US 2009/0128587 A1 May 21, 2009

(30) Foreign Application Priority Data

Nov. 19, 2007 (JP) ................................. 2007-299241

(51) Int. Cl.
*G09G 5/00* (2006.01)
*G09G 5/02* (2006.01)
*H04N 17/00* (2006.01)
*H04N 5/57* (2006.01)
*H04N 1/60* (2006.01)
*G03F 3/08* (2006.01)
*G06K 9/00* (2006.01)
*H04N 7/00* (2006.01)
*H04N 1/46* (2006.01)
*G06K 9/40* (2006.01)

(52) U.S. Cl. ........ 345/589; 345/591; 345/690; 345/602; 345/619; 348/180; 348/552; 348/602; 348/687; 358/1.9; 358/518; 358/509; 358/523; 382/162; 382/167; 382/254; 382/274

(58) Field of Classification Search .......... 345/426–427, 345/581, 589–591, 593, 604, 600–602, 619, 345/156, 549, 204, 207, 690, 1.1–1.2, 5, 345/48, 63, 76–77, 88; 348/180, 254, 552, 348/557, 602, 687; 358/1.9, 504, 518–519, 358/509, 523
See application file for complete search history.

(56) References Cited

U.S. PATENT DOCUMENTS

| | | | | |
|---|---|---|---|---|
| 7,352,488 | B2 * | 4/2008 | Ben-Chorin et al. | .......... 358/1.9 |
| 7,564,584 | B2 * | 7/2009 | Takahashi et al. | .............. 358/2.1 |
| 2002/0015044 | A1 * | 2/2002 | Edge et al. | ..................... 345/600 |
| 2002/0071605 | A1 * | 6/2002 | Iida et al. | ...................... 382/165 |
| 2002/0080147 | A1 * | 6/2002 | Edge et al. | ..................... 345/600 |

(Continued)

FOREIGN PATENT DOCUMENTS

EP 1079605 2/2001

(Continued)

*Primary Examiner* — Wesner Sajous
(74) *Attorney, Agent, or Firm* — Volpe and Koenig, P.C.

(57) ABSTRACT

In a color reproduction system for displaying an image subjected to color conversion processing by a server side system on a monitor device of a user side system, the server side system comprises a first storage unit for storing a multi-spectrum image, a second storage unit for storing color reproduction characteristic information, which is information relating to a color reproduction characteristic when the image is displayed on the monitor device, a server side communication unit for receiving the color reproduction requirement information transmitted from the user side communication unit via the network, and a color conversion processing unit for obtaining, from the second storage unit, color reproduction characteristic information corresponding to the color reproduction requirement information, and performing color conversion processing on the multi-spectrum image on the basis of the obtained color reproduction characteristic information.

11 Claims, 7 Drawing Sheets

U.S. PATENT DOCUMENTS

| | | | |
|---|---|---|---|
| 2002/0159083 A1* | 10/2002 | Arai et al. | 358/1.9 |
| 2003/0091229 A1* | 5/2003 | Edge et al. | 382/162 |
| 2004/0021885 A1* | 2/2004 | Nishikawa | 358/1.9 |
| 2004/0071366 A1* | 4/2004 | Zhang et al. | 382/284 |
| 2004/0227769 A9* | 11/2004 | Edge et al. | 345/600 |

FOREIGN PATENT DOCUMENTS

JP  2001060082  3/2001

* cited by examiner

FIG. 4

NV IMAGE DISTRIBUTION SYSTEM

| USER LOGIN | PRODUCTS | CHECKOUT | USER REQUEST INFORMATION | POSITION SPECTRUM INFORMATION | SYSTEM INFORMATION |

CART INFORMATION

TOTAL CHARGE: ¥260,000   (PURCHASE)

| PURCHASE | IMAGE | IMAGE NAME | SIZE | FORMAT | PERIOD | NUMBER | PRICE |
|---|---|---|---|---|---|---|---|
| ☑ | A | FLOWERS A | 1280×1024 | RAW | ONE YEAR | 1 | ¥70,000 |
| ☑ | B | SEA B | 1024×768 | JPEG | ENTIRE PERIOD | 1 | ¥150,000 |
| ☑ | C | SPACE C | 640×480 | BMP | THREE MONTHS | 1 | ¥40,000 |
|  |  |  |  |  |  |  |  |
|  |  |  |  |  |  |  |  |
|  |  |  |  |  |  |  |  |

■ PAYMENT METHOD
● CARD
　TYPE: VISA
　NUMBER:
○ BANK TRANSFER

■ SHIPPING ADDRESS
ADDRESS: 〒123-4567
TOKYO ××WARD △△
Mr./Mrs. ××○○
■ PURCHASING MEDIUM
DVD-R

COLOR REPRODUCTION SYSTEM, COLOR REPRODUCTION DEVICE, COLOR REPRODUCTION METHOD, AND COMPUTER-READABLE RECORDING MEDIUM RECORDED WITH COLOR REPRODUCTION PROGRAM

FIELD OF THE INVENTION

This invention relates to technique for displaying an image subjected to color conversion processing by a server side system on a display monitor of a user side system.

BACKGROUND OF THE INVENTION

In a known conventional technique, a color image is obtained from a server device via a network, color conversion processing based on a monitor profile is performed on the obtained color image, and then the image is displayed on a display monitor (see JP2001-60082A).

SUMMARY OF THE INVENTION

With this conventional technique, however, image data transmitted from the server device to the monitor on a user side are image data of a predetermined sRGB color space, and it may therefore be impossible to display the image in correct colors, depending on the type of the monitor. For example, when a monitor compliant with Adobe RGB or xvYCC, which have a considerably larger color reproduction gamut than sRGB, receives an sRGB-standard image, accurate color display cannot be performed. To achieve accurate color display on an Adobe RGB or xvYCC compliant monitor, Adobe RGB-standard and xvYCC-standard images must be prepared in the server device in addition to the sRGB-standard image, leading to an increase in the data volume of the server device.

According to a first aspect of the present invention, there is provided a color reproduction system for displaying an image subjected to color conversion processing by a server side system on a monitor device of a user side system, wherein the user side system comprises an input unit for inputting color reproduction requirement information, which is information relating to a color reproduction requirement when the image is displayed on the monitor device, and a user side communication unit for transmitting the color reproduction requirement information to the server side system via a network. The server side system comprises a first storage unit for storing a multi-spectrum image, a second storage unit for storing color reproduction characteristic information, which is information relating to a color reproduction characteristic when the image is displayed on the monitor device, a server side communication unit for receiving the color reproduction requirement information transmitted from the user side communication unit via the network, and a color conversion processing unit for obtaining, from the second storage unit, color reproduction characteristic information corresponding to the color reproduction requirement information received by the server side communication unit, and performing color conversion processing on the multi-spectrum image on the basis of the obtained color reproduction characteristic information.

According to a second aspect of the present invention, there is provided a color reproduction device for performing color conversion processing on an image to be displayed on a monitor device of a user side system that can be connected via a network, comprising a first storage unit for storing a multi-spectrum image, a second storage unit for storing color reproduction characteristic information, which is information relating to a color reproduction characteristic when the image is displayed on the monitor device, an acquisition unit for obtaining color reproduction requirement information, which is information relating to a color reproduction requirement when the image is displayed on the monitor device, from the user side system via the network, and a color conversion processing unit for obtaining, from the second storage unit, color reproduction characteristic information corresponding to the color reproduction requirement information, and performing color conversion processing on the multi-spectrum image on the basis of the obtained color reproduction characteristic information.

According to a third aspect of the present invention, there is provided a color reproduction method for performing color conversion processing on an image to be displayed on a monitor device of a user side system that can be connected via a network, comprising obtaining color reproduction requirement information, which is information relating to a color reproduction requirement when the image is displayed on the monitor device, from the user side system via the network, obtaining color reproduction characteristic information corresponding to the obtained color reproduction requirement information from color reproduction characteristic information, which is information relating to a color reproduction characteristic when the image is displayed on the monitor device, and performing color conversion processing on a multi-spectrum image on the basis of the obtained color reproduction characteristic information.

According to a fourth aspect of the present invention, there is provided a computer-readable recording medium storing a color reproduction program for causing a computer to execute color conversion processing on an image to be displayed on a monitor device of a user side system that can be connected via a network, wherein the color reproduction program comprises obtaining color reproduction requirement information, which is information relating to a color reproduction requirement when the image is displayed on the monitor device, from the user side system via the network, obtaining color reproduction characteristic information corresponding to the obtained color reproduction requirement information from color reproduction characteristic information, which is information relating to a color reproduction characteristic when the image is displayed on the monitor device, and performing color conversion processing on a multi-spectrum image on the basis of the obtained color reproduction characteristic information.

BRIEF DESCRIPTION OF THE DRAWINGS

FIG. 4 is a view showing an example of a checkout screen.

DESCRIPTION OF THE PREFERRED EMBODIMENTS

First Embodiment

Systems for purchasing image data using a network are well known. A user purchases image data using an image data purchasing system, and displays the purchased image data on a monitor device. A website called "OADIS" is known as this type of image data purchasing system. Below, a first embodiment in which a color reproduction system according to this invention is applied to an image data purchasing system will be described.

Examples of the user purchasing the image data include a designer or a creative director who creates catalogs, books, guide materials, and so on for a publishing company, a printing company, an advertising agency, a travel agency, or the like. The user searches for and purchases a desired image by operating a personal computer. It should be noted that the image data purchaser is not limited to the examples described above.

Figure 1:
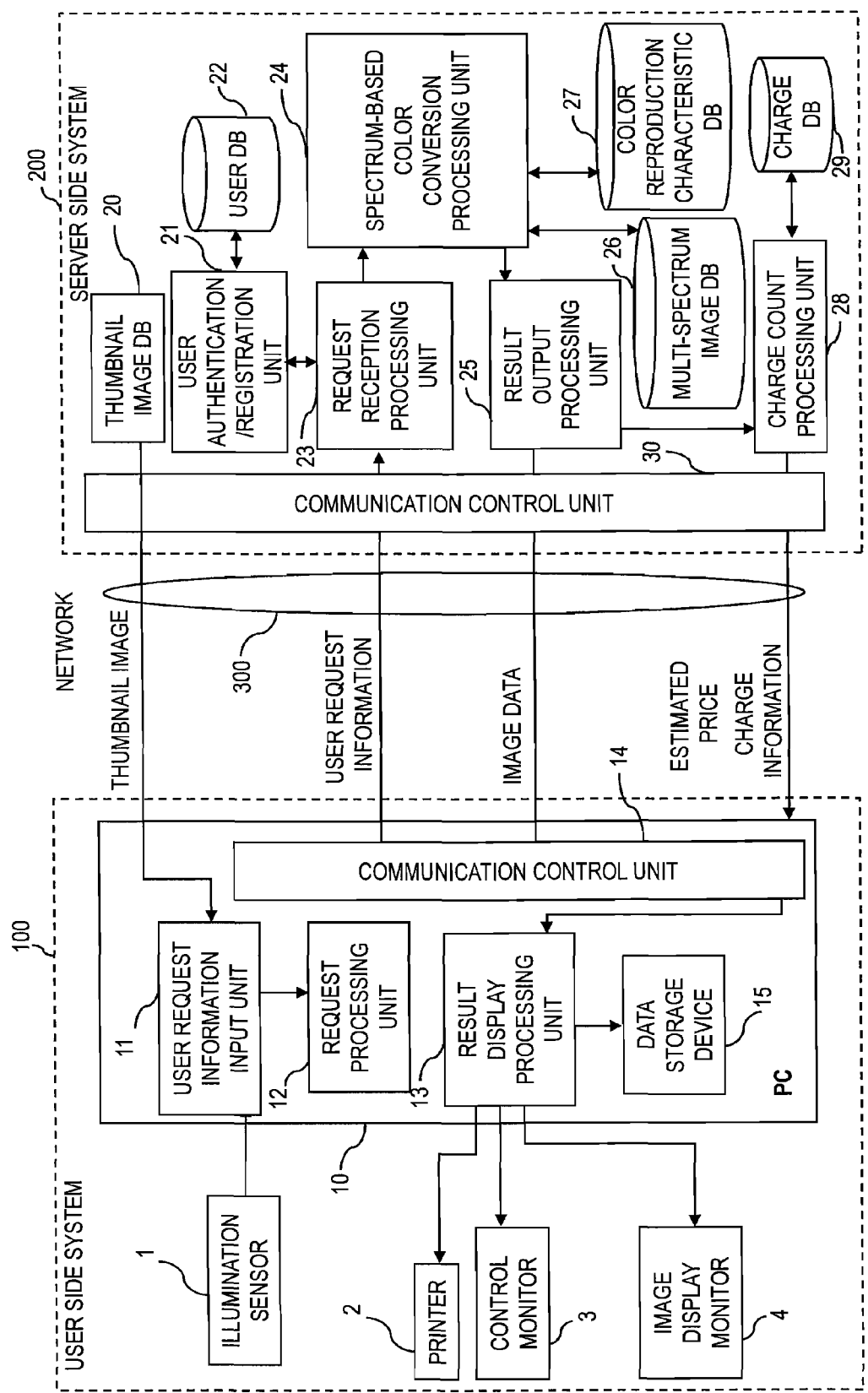
FIG. 1 is a view showing the overall constitution of a color reproduction system according to a first embodiment.

FIG. 1 is a view showing the overall constitution of a color reproduction system according to the first embodiment. The color reproduction system according to the first embodiment is constituted by a user side system 100, a server side system 200, and a network 300.

The user side system 100 comprises an illumination sensor 1, a printer 2, a control monitor 3, an image display monitor 4, and a personal computer 10 (to be referred to hereafter as PC 10). The PC 10 comprises a user request information input unit 11, a request processing unit 12, a result display processing unit 13, a communication control unit 14, and a data storage device 15.

The illumination sensor 1 measures illumination light in a room in which the user side system 100 is provided, or more specifically the spectrum of observing illumination light illuminating the viewing environment of the image display monitor 4. The printer 2 is used to print image data purchased from the server side system 200, to be described below, via the network 300, for example.

The control monitor 3 displays screens of various types of application software provided in the PC 10, for example an image search screen and so on, to be described below. The image display monitor 4 is a large liquid crystal or plasma monitor, for example, and is used to display image data purchased from the server side system 200.

Functions of the various processing units provided in the PC 10 will now be described while referring to the screens displayed on the control monitor 3 when the user purchases image data.

Figure 2:
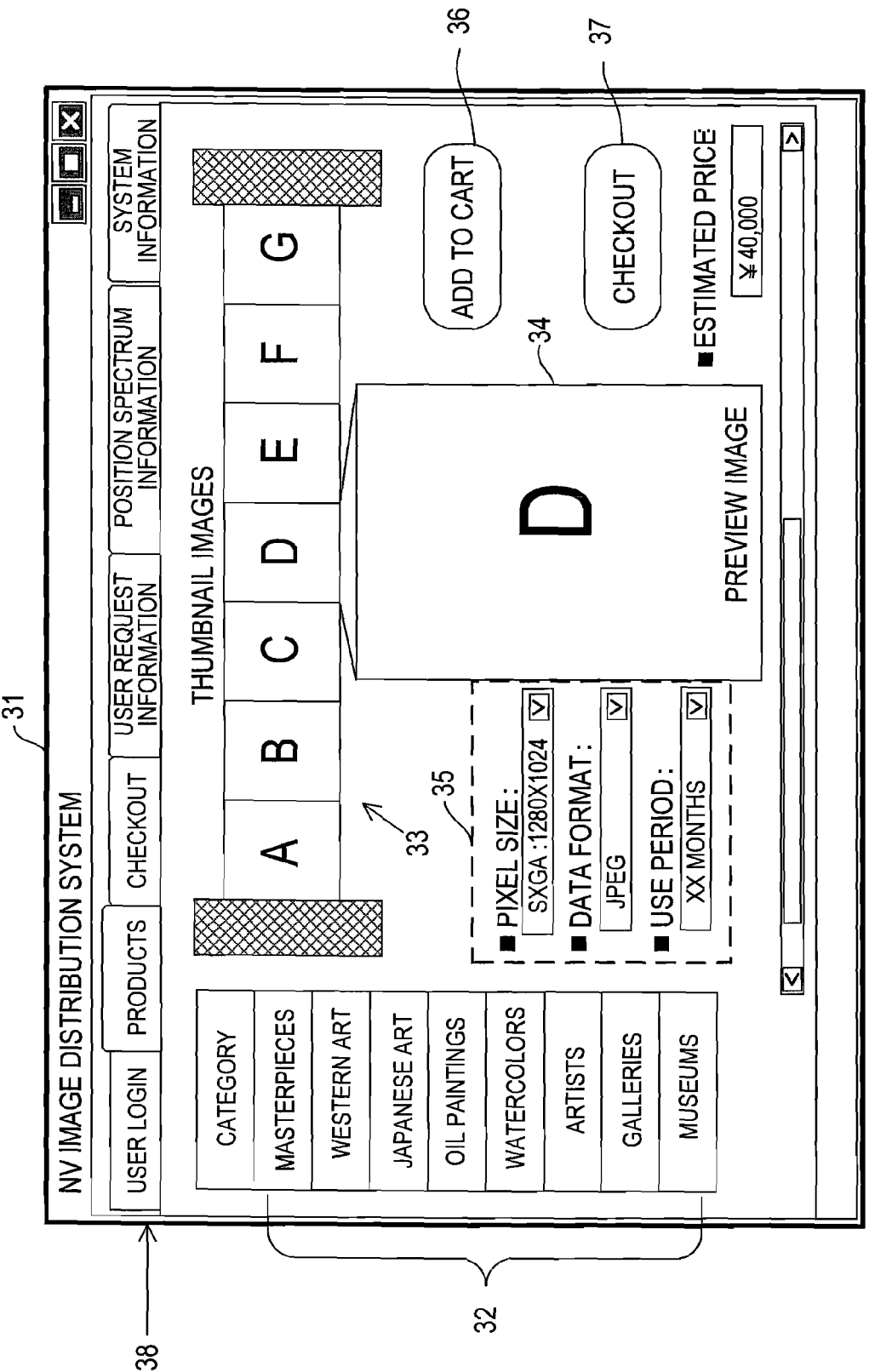
FIG. 2 is a view showing an example of an image search screen.

FIG. 2 is a view showing an example of an image search screen, which is a screen for searching for desired image data during image data purchase. When the server side system 200 is accessed by the PC 10 via the network 300, for example when a website of an image data purchasing system or the like is accessed, a screen of the image data purchasing system is displayed on the control monitor 3. As shown in FIG. 2, the screen of the image data purchasing system displays sheets 38 such as "User login", "Products", "Checkout", and "User request information" selectably.

To use the image data purchasing system, the user must select the "User login" sheet and perform a login procedure. When the user selects the "Products" sheet after completing the login procedure, an image search screen 31 such as that shown in FIG. 2 is displayed on the control monitor 3.

Category selection tabs 32 for selecting a category of purchasable images are displayed on the left side of the image search screen 31. In the display example shown in FIG. 2, "Masterpieces", "Western art", "Japanese art", "Oil paintings", "Watercolors", "Artists", "Galleries", and "Museums" are displayed as the image categories.

When the user selects a desired category from the category selection tabs 32, a plurality of images belonging to the selected category are displayed as thumbnail images 33. In the example shown in FIG. 2, "Western art" is selected as the image category, and therefore a plurality of images belonging to the Western art category are displayed as the thumbnail images 33. In FIG. 2, the thumbnail images are allocated alphabetic characters from A to G for the purpose of differentiation.

When the user mouse-clicks on a desired image from among the plurality of thumbnail images, the image is displayed in an enlarged form as a preview image 34. In the example shown in FIG. 2, the thumbnail image D is displayed in an enlarged form as the preview image 34.

A column 35 for selecting a pixel size of the image, a data format (BMP, JPEG, TIFF, and so on), and a use period is displayed on the left side of the preview image 34. The user selects a desired pixel size of the image to be purchased, a desired data format, and a use period of the purchased image from a pull-down menu.

When the user wishes to purchase the preview image 34, the user clicks a button 36 displayed as "Add to cart". One or a plurality of images may be purchased. After clicking the "Add to cart" button 36 in relation to all of the images to be purchased, the user clicks a button 37 displayed as "Checkout", whereupon a checkout screen to be described below is displayed on the control monitor 3.

To purchase the image data, the user must at least input color reproduction requirement information, which is information relating to color reproduction requirements during display of the purchased image on the image display monitor 4. The color reproduction requirement information includes information relating to a display characteristic of the image display monitor 4 and information relating to rendering illumination light. Rendering illumination light is illumination light assumed to illuminate an object presumed to be irradiated with illumination having a certain specific spectral characteristic when the object is displayed on a monitor.

Figure 3:
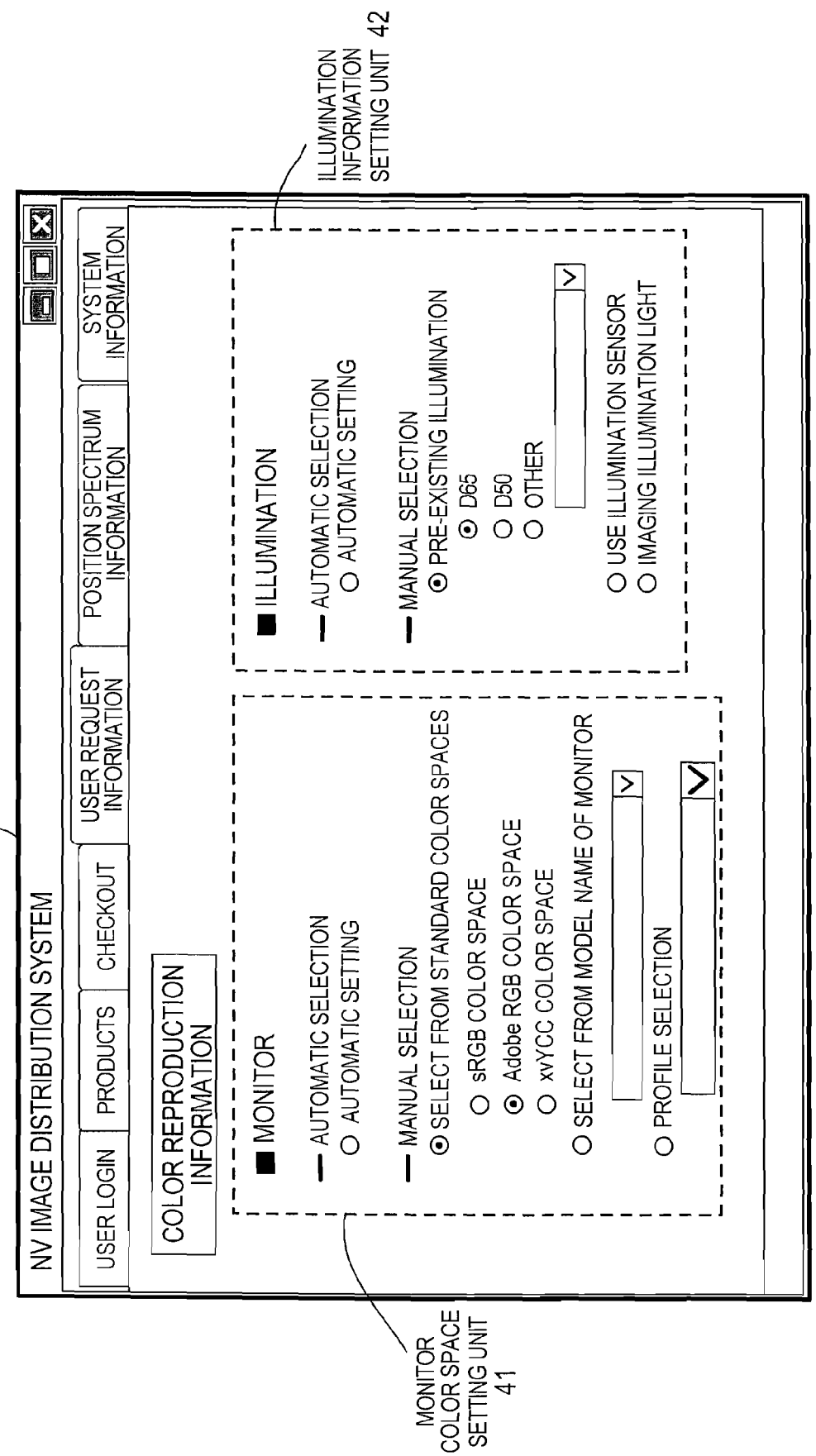
FIG. 3 is a view showing an example of a screen on which a user inputs color reproduction requirement information.

FIG. 3 is a view showing an example of a screen on which the user inputs the color reproduction requirement information. When the user selects a sheet displayed as "User request information", a screen such as that shown in FIG. 3 is displayed on the control monitor 3. On a screen 40 shown in FIG. 3, a monitor color space setting unit 41 and an illumination information setting unit 42 are provided on a left side and a right side of the screen, respectively. The monitor color space setting unit 41 is a screen for inputting color space information relating to the image display monitor 4, or in other words information relating to the display characteristic, while the illumination information setting unit 42 is a screen for inputting information relating to the rendering illumination light.

First, the monitor color space setting unit 41 will be described. Two setting methods, namely "Automatic selection" and "Manual selection", are provided as methods to set the color space of the image display monitor 4. When the user wishes to set the color space of the monitor him/herself, he/she selects a desired method from among "Select from standard color spaces", "Select from model name of monitor", and "Profile selection" within the "Manual selection" item.

Currently, many monitors are equipped with sRGB, which is a standard color space. When this type of monitor is used, accurate color reproduction is possible as long as a display signal is an sRGB space image signal. Hence, when the color space of the monitor has already been determined as a standard color space, the user indicates the color space of the image display monitor 4 by selecting "Select from standard color spaces" within the "Manual selection" item. On the screen shown in FIG. 3, sRGB, Adobe RGB, and xvYCC can be selected as standard color spaces.

When the color space of the image display monitor 4 does not correspond to a standard color space or the color space of the image display monitor 4 is unknown, the user may select the model name of the image display monitor 4. When the maker or model name of the image display monitor 4 is known, monitor information may be provided by the monitor maker or a third party as a profile. In this case, the user selects "Select from model name of monitor", and then selects the model name of the image display monitor 4 from a plurality of model names displayed on a pull-down menu.

When the user is capable of measuring the profile of the image display monitor 4 directly, he/she selects "Profile selection", and then selects a measured profile from a plurality of profiles displayed on a pull-down menu. The profile of the image display monitor 4 may be measured using a known method.

When the user selects "Automatic setting" within "Automatic selection" in the monitor color space setting unit 41, the color space of the image display monitor 4 is set automatically in the PC 10 without the need for instructions from the user. With this setting method, the user is not forced to perform a complicated operation to indicate the color space of the image display monitor 4. For example, when the profile of the image display monitor 4 is found, that profile is selected, and when a monitor profile can be found from the model name of the image display monitor 4, a profile corresponding to the model name is selected.

Next, the illumination information setting unit 42 will be described. Two setting methods, namely "Automatic selection" and "Manual selection", are also provided as methods to set the rendering illumination light. When the user wishes to set the rendering illumination light him/herself, he/she selects a desired method from among "Pre-existing illumination", "Use illumination sensor", and "Imaging illumination light" within the "Manual selection" item.

On the screen shown in FIG. 3, "D65", "D50", and "Other" may be selected as the "Pre-existing illumination". For example, when the user purchases the data of a painting as the image data and wishes to view an image of the painting as seen under a D50 fluorescent lamp, he/she selects "D50". When the user wishes to select illumination other than "D65" and "D50", he/she selects "Other", and then selects the desired illumination from a plurality of types of illumination displayed on a pull-down menu.

When the user selects "Use illumination sensor", a spectrum of illumination light measured by the illumination sensor 1 is used as the rendering illumination light information. For example, when the user purchases the data of a painting as the image data and wishes to view an image of the painting as seen under the illumination light of the environment in which the image display monitor 4 is disposed, he/she selects "Use illumination sensor". This method is employed to display an image as if the original painting were actually in that location.

When the user wishes to view the painting under the illumination light in which the image was captured, he/she selects "Imaging illumination light". For example, when a captured image of a landscape is displayed on the image display monitor 4 and the user wishes to reproduce the image in the colors at the time of the actual image shooting, he/she selects "Imaging illumination light".

It should be noted that the illumination light of the environment in which the image display monitor 4 is disposed typically differs from the imaging illumination light, and therefore chromatic adaptation processing is preferably performed to match the "color appearance".

When the user selects "Automatic setting" within "Automatic selection" in the illumination information setting unit 42, the rendering illumination light is set automatically in the PC 10 without the need for instructions from the user. With this setting method, the user is not forced to perform a complicated operation to indicate the rendering illumination light. For example, when the illumination sensor 1 is connected to the PC 10 of the user, the spectrum of the illumination light measured by the illumination sensor 1 is used as the rendering illumination light information. When the illumination sensor 1 is not connected, the pre-existing illumination D65, for example, is set as the rendering illumination light.

Measuring the spectrum of the illumination light using the illumination sensor 1 every time image data are purchased may become troublesome. Hence, the measurement data generated by the illumination sensor 1 may be stored in a storage device, not shown in the figures, and read from the storage device when image data are to be purchased. When this method is employed, a selection displayed as "Currently connected illumination sensor" and a selection displayed as "Use saved data" may be provided in the "Use illumination sensor" item of the illumination information setting unit 42, and the user may select either one.

Further, when the rendering illumination light has been selected, the spectrum of the selected rendering illumination light may be displayed on the control monitor 3. In this case, the user can check the spectral waveform of the rendering illumination light.

The color reproduction requirement information, or more specifically the information relating to the display characteristic of the image display monitor 4 input into the monitor color space setting unit 41 and the rendering illumination light information input into the illumination information setting unit 42, is input into the user request information input unit 11 of the PC 10 as user request information. The user request information also includes information relating to the type of the purchased image data, the pixel size of the image data, the data format, the use period, a purchasing medium, and so on.

FIG. 4 is a view showing an example of a checkout screen 45 displayed on the control monitor 3 when the checkout button 37 shown in FIG. 2 is clicked. A purchase image information column 46, a payment method information column 47, and a shipping address and purchasing medium information column 48 are displayed on the checkout screen 45.

In the purchase image information column 46, information relating to images for which the "Add to cart" button 36 was clicked on the screen shown in FIG. 2 is displayed. On the screen shown in FIG. 4, information relating to three images, namely "A", "B" and "C", is displayed, and information relating to the image title, image size, image format (data format), use period, number, and price is provided as image information.

The payment method information column 47 is a column for inputting a method of paying for the purchased image data. The shipping address and purchasing medium information column 48 is a column for inputting a shipping address for the purchased image data and a purchasing medium of the image data. Although not shown in the figure, in addition to "DVD-R" shown in FIG. 4, "Online" is included in the pull-down menu for selecting the purchasing medium as a purchasing medium in which the image data are transmitted to the user side system 100 via the network 300.

The user inserts a check in a farthest left-side purchasing check column in relation to the images he/she actually intends to purchase from among the images displayed in the purchase image information column 46, and then clicks a purchase button 49.

The request processing unit 12 of the PC 10 issues a request to purchase the image data to the server side system 200 on the basis of the user request information input into the user request information input unit 11. The communication control unit 14 controls communication conducted with the server side system 200 via the network 300.

The result display processing unit 13 performs processing to display data transmitted from the server side system 200 via the communication control unit 14 on the control monitor 3 or the image display monitor 4. For example, when data including image data charge information, to be described below, are transmitted from the server side system 200, the data are displayed on the control monitor 3, and when purchased image data are transmitted, the transmitted image is displayed on the image display monitor 4. The data storage device 15 stores the image data transmitted from the server side system 200.

The server side system 200 comprises a thumbnail image database 20 (to be referred to hereafter as a thumbnail image DB 20), a user authentication/registration unit 21, a user database 22 (to be referred to hereafter as a user DB 22), a request reception processing unit 23, a spectrum-based color conversion processing unit 24, a result output processing unit 25, a multi-spectrum image database 26 (to be referred to hereafter as a multi-spectrum image DB 26), a color reproduction characteristic database 27 (to be referred to hereafter as a color reproduction characteristic DB 27), a charge count processing unit 28, a charge database 29 (to be referred to hereafter as a charge DB 29), and a communication control unit 30.

As described above using FIG. 2, a plurality of thumbnail images used by the user to select an image to be purchased are recorded in the thumbnail image DB 20.

To use the image data purchasing system, the user must perform user registration in advance. The user authentication/registration unit 21 performs user registration processing for a user using the image data purchasing system for the first time and authentication processing for a user using the image data purchasing system for a second time onward. In the user registration processing, information such as the name and address of the user is registered in the user DB 22. In the user authentication processing, user authentication processing is performed on the basis of the user registration information recorded in the user DB 22.

Registration information relating to a registered user, such as the name and address of the user, is recorded in the user DB 22. Image data purchased by the user in the past and image data listed as purchasing candidate images intended to be purchased by the user are also recorded in the user DB 22. The images listed as purchasing candidate images are images for which the "Add to cart" button 36 was clicked on the screen shown in FIG. 2 but a check was not inserted into the purchasing check column on the checkout screen shown in FIG. 4.

The request reception processing unit 23 performs processing to receive the user request information transmitted from the user side system 100 via the communication control unit 30. As described above, the user request information is information relating to the color reproduction requirement information, the pixel size of the image data, the data format, the use period, the purchasing medium, and so on. Once the processing to receive the user information has been performed by the request reception processing unit 23, user authentication processing is performed in the user authentication/registration unit 21 described above.

Multi-spectrum images corresponding respectively to the plurality of thumbnail images recorded in the thumbnail image DB 20 are recorded in the multi-spectrum image DB 26. A multi-spectrum image is an image of multiple (four or more) bands having different spectral sensitivity characteristics, which is obtained through image pick-up using a camera capable of multi-band photography, known as a multi-spectrum camera, for example.

Color reproduction characteristic information, which is information relating to a color reproduction characteristic when an image is displayed on the image display monitor 4, is recorded in the color reproduction characteristic DB 27. The color reproduction characteristic information includes spectral data relating to the imaging illumination light at the time of generation of the multi-spectrum image, spectral characteristic data relating to the imaging device, data relating to the display characteristics of various types of monitors, and spectral data relating to various types of rendering illumination light.

The spectrum-based color conversion processing unit 24 generates the image desired by the user on the basis of the user request information transmitted from the server side system 200. More specifically, the spectrum-based color conversion processing unit 24 reads the multi-spectrum image that the user wishes to purchase from the multi-spectrum image DB 26, and reads data relating to the display characteristic of the image display monitor 4 and spectral data relating to the rendering illumination light, input into the user request information input unit 11 of the PC 10, from the color reproduction characteristic DB 27 on the basis of the color reproduction requirement information included in the user request information. The spectrum-based color conversion processing unit 24 then performs predetermined color conversion processing on the read multi-spectrum image on the basis of the read data relating to the display characteristic of the image display monitor 4 and spectral data relating to the rendering illumination light, as well as the spectral data of the imaging illumination light at the time of generation of the multi-spectrum image and the spectral characteristic data of the imaging device. The color conversion processing is processing to reproduce the hues of the image object when irradiated with the rendering illumination light on the image display monitor 4, and may be performed using a known method.

The spectrum-based color conversion processing unit 24 also performs processing to convert the color conversion-processed image into an RGB image of the instructed pixel size and the instructed data format on the basis of the pixel size and data format information included in the user request information. The conversion-processed image data are then transmitted to the result output processing unit 25.

It should be noted that a typical three primary color monitor is envisaged as the image display monitor 4, and therefore the conversion-processed image is described as being an RGB image. However, when the image display monitor 4 is a multiple primary color monitor having four or more primary colors, the image is preferably converted into a multiple primary color image.

The result output processing unit 25 performs predetermined data format conversion processing on the image data subjected to color conversion processing by the spectrum-based color conversion processing unit 24, and then transmits the image data to the user side system 100 via the communication control unit 30. Further, the result output processing unit 25 issues a charge data calculation request to the charge count processing unit 28.

Data required to calculate a charge for the image purchased by the user are recorded in the charge DB 29. In accordance with the calculation request from the result output processing unit 25, the charge count processing unit 28 calculates the price of the image that the user wishes to purchase using the data recorded in the charge DB 29. Price calculation is performed on the basis of the type of the image that the user wishes to purchase, and the pixel size and use period included in the user request information. The price calculated by the charge count processing unit 28 is transmitted to the user side system 100 via the communication control unit 30.

It is assumed in the above description that identical color conversion processing is performed on all of the purchased images, but the color reproduction requirement information may be set for each purchased image such that different color conversion processing is performed on each purchased image.

According to the color reproduction system of the first embodiment, multi-spectrum images are recorded in the server side system 200 together with color reproduction characteristic information, which is information relating to a color reproduction characteristic when an image is displayed on the image display monitor 4. Color reproduction characteristic information corresponding to the color reproduction requirement information transmitted from the user side system 100 via the network 300 is obtained, and then color conversion processing is performed on the multi-spectrum images on the basis of the obtained color reproduction characteristic information. As a result, image data of various color spaces corresponding to the color reproduction requirement information can be provided without increasing the data volume of the server side system 200.

Further, according to the color reproduction system of the first embodiment, the color reproduction requirement information includes monitor characteristic information, which is information relating to the display characteristic of the image display monitor 4, and information relating to the rendering illumination light. Therefore, color conversion processing corresponding to the display characteristic of the image display monitor 4 that displays the image and the rendering illumination light desired by the user can be performed.

In particular, according to the color reproduction system of the first embodiment, the user can select any of the imaging illumination light at the time of multi-spectrum image generation, pre-existing illumination light, and the illumination light of the viewing environment of the image display monitor 4 as the rendering illumination light. Hence, the user can indicate the desired rendering illumination light easily.

Figure 5:
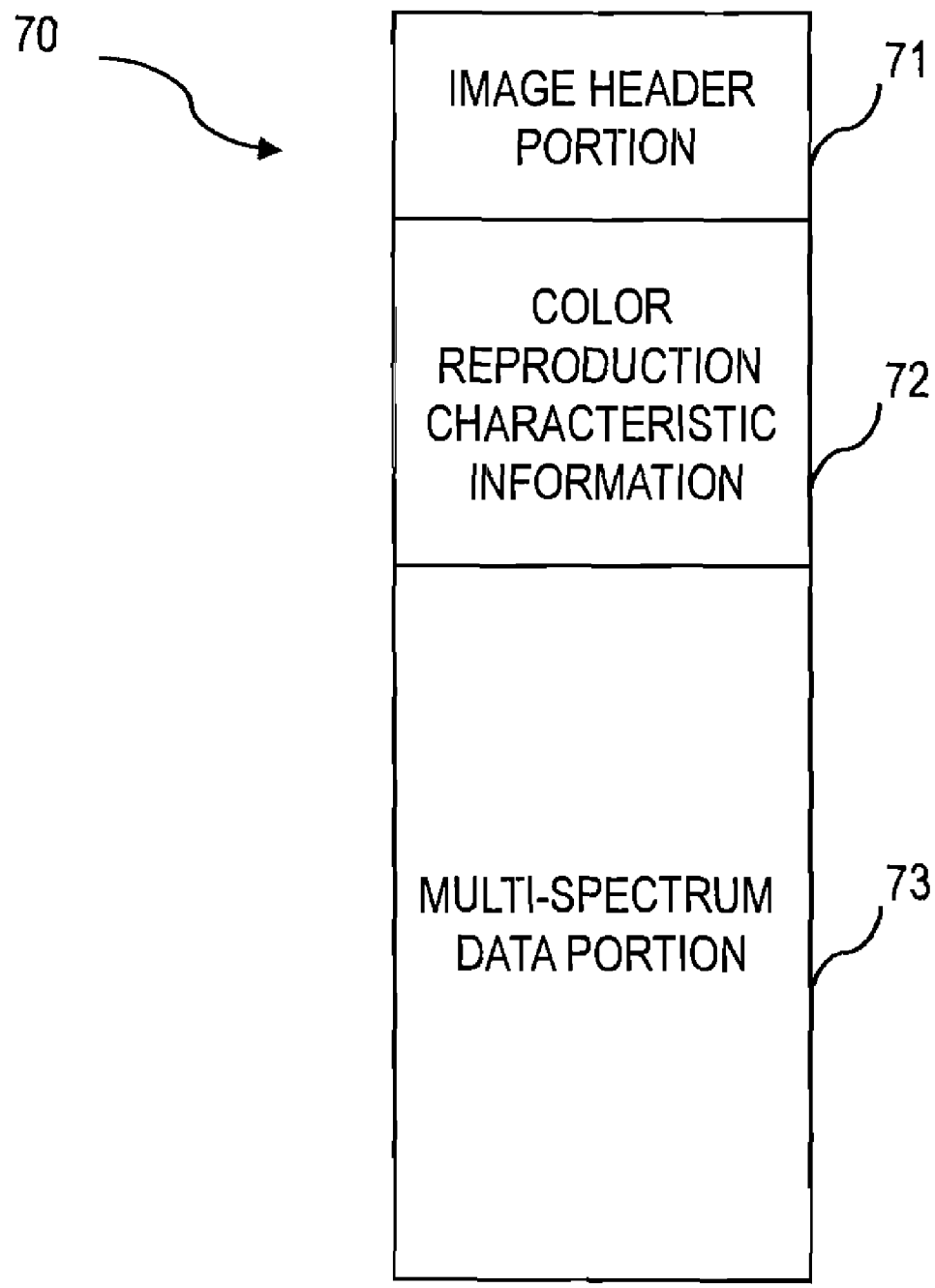
FIG. 5 is a view showing the constitution of multi-spectrum image data including spectrum data of imaging illumination light and spectral characteristic data of an imaging device.

It should be noted that within the color reproduction characteristic information, the spectral data of the imaging illumination light and the spectral characteristic data of the imaging device are determined when the multi-spectrum image is captured, and may therefore be buried in multi-spectrum image data 70, as shown in FIG. 5. The multi-spectrum image data 70 shown in FIG. 5 are constituted by an image header portion 71, color reproduction characteristic information 72, and a multi-spectrum data portion 73. The multi-spectrum data portion 73 is the part in which the data relating to the multi-spectrum image are recorded. The color reproduction characteristic information 72 includes the spectral data of the imaging illumination light and the spectral characteristic data of the imaging device. In this case, color reproduction characteristic information not including the spectral data of the imaging illumination light and the spectral characteristic data of the imaging device is recorded in the color reproduction characteristic DB 27.

Furthermore, according to the color reproduction system of the first embodiment, the spectrum-based color conversion processing unit 24 that performs color conversion processing on the image is provided in the server side system 200, thereby eliminating the need to perform large-load color conversion processing in the user side system.

It is assumed in the above description that the processing performed by the server side system 200 is hardware processing, but this invention need not be limited to such a constitution, and the processing may be performed by separate software, for example. In this case, the server side system 200 comprises a CPU, a main storage device such as a RAM, and a computer-readable recording medium recording a program for realizing all or a part of the processing described above. Here, the program is referred to as a color reproduction program. By having the CPU read the color reproduction program recorded on the recording medium and execute an information processing/calculation process, similar processing to that of the server side system 200 described above is realized.

Here, the computer-readable recording medium denotes a magnetic disk, a magneto-optical disk, a CD-ROM, a DVD-ROM, semiconductor memory, and so on. Further, the color reproduction program may be distributed to a computer through a communication line, and having received the distributed program, the computer may execute the color reproduction program.

A processing procedure relating to color reproduction processing and charge calculation processing realized by having the CPU execute the color reproduction program will now be described with reference to FIG. 6.

Figure 6:
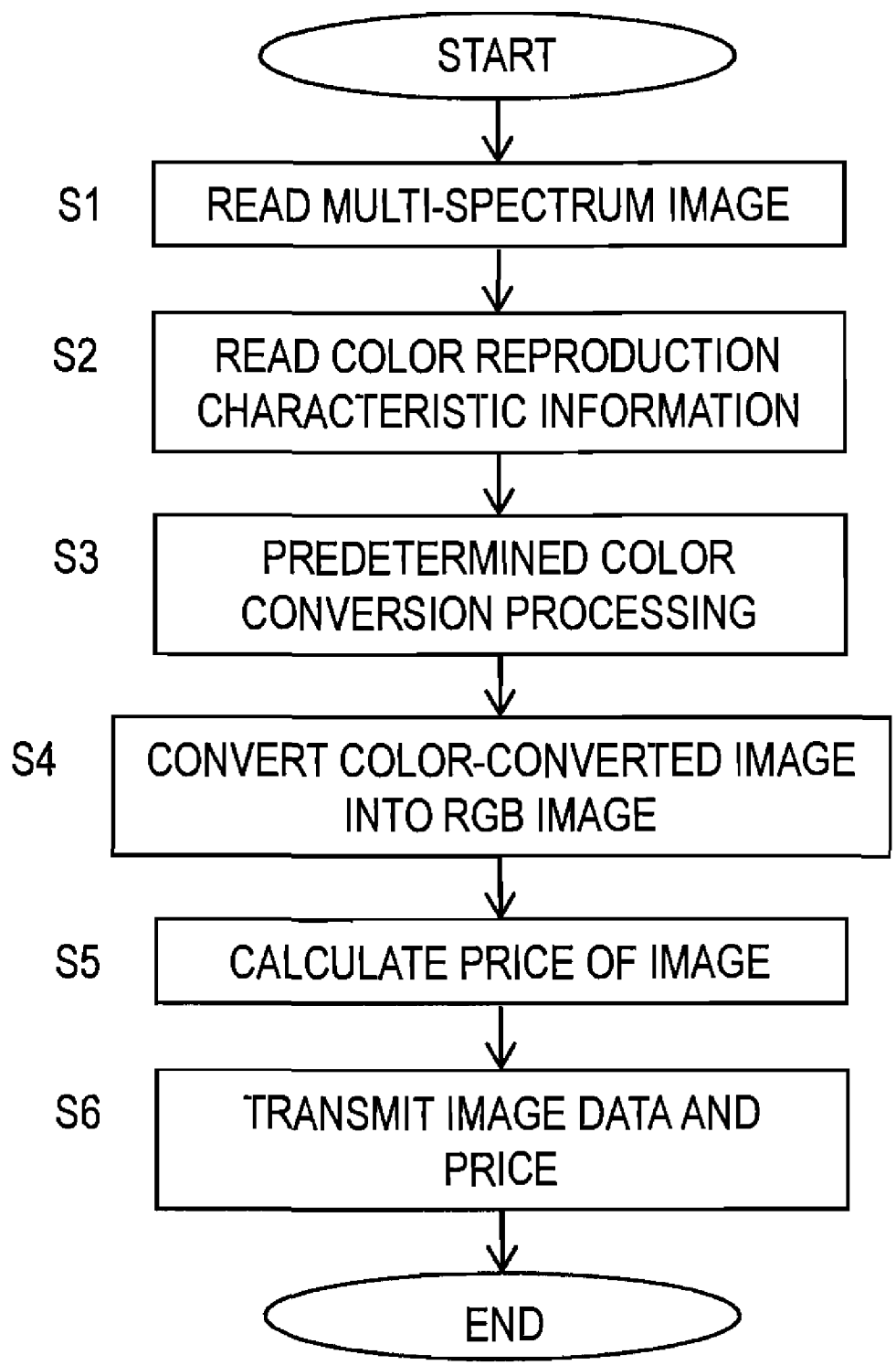
FIG. 6 is a flowchart showing a processing procedure of color reproduction processing and charge calculation processing, which are realized by having a CPU execute a color reproduction program.

First, in a step S1 of FIG. 6, a multi-spectrum image that the user wishes to purchase is read from the multi-spectrum image DB 26 on the basis of information relating to the type and so on of the image data to be purchased, from the user request information obtained from the user side system 100 via the communication control unit 30. In a step S2, color reproduction characteristic information is read from the color reproduction characteristic DB 27 on the basis of the color reproduction requirement information obtained from the user side system 100 via the communication control unit 30.

In a step S3, predetermined color conversion processing is performed on the multi-spectrum image read from the multi-spectrum image DB 26. As described above, the color conversion processing is processing to reproduce the hues of the image object when irradiated with the rendering illumination light on the image display monitor 4 of the user side system 100.

In a step S4, the color conversion-processed image is converted into an RGB image in the instructed pixel size and the instructed data format. In a step S5, a charge for the image that the user wishes to purchase is calculated using the data recorded in the charge DB 29. In a step S6, predetermined data format conversion processing is performed on the image data, whereupon the image data and the calculated charge data are transmitted to the user side system 100 via the communication control unit 30. The processing is then terminated.

Second Embodiment

Figure 7:
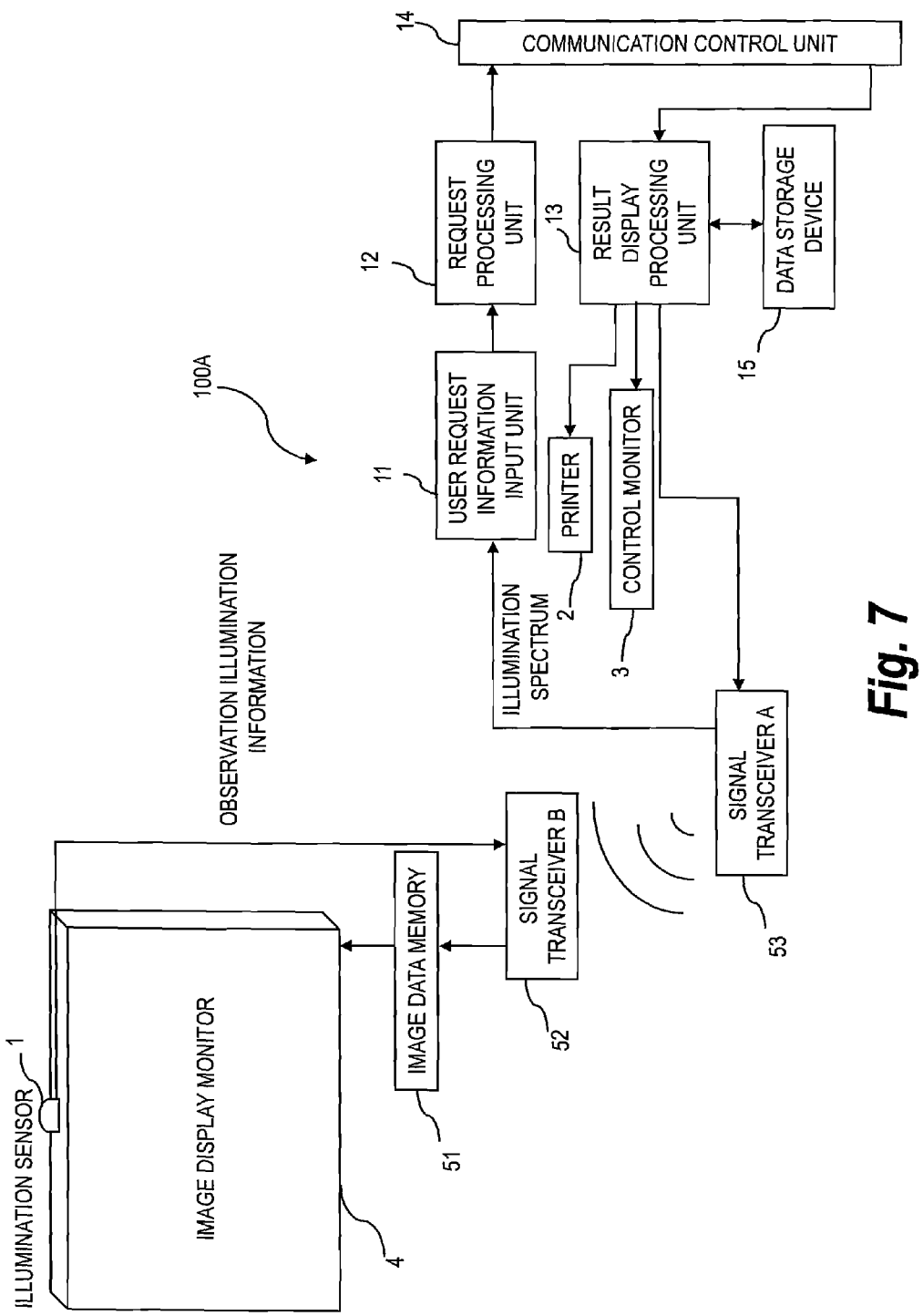
FIG. 7 is a view showing the constitution of a user side system in a color reproduction system according to a second embodiment.

FIG. 7 is a view showing the constitution of a user side system 100A in a color reproduction system according to a second embodiment. The constitution of the server side system is identical to the constitution of the server side system 200 shown in FIG. 1, and therefore illustration and detailed description thereof have been omitted. In the user side system 100A shown in FIG. 7, identical constitutions to those of the user side system 100 shown in FIG. 1 have been allocated identical reference numerals, and detailed description thereof has been omitted.

In the color reproduction system according to the second embodiment, the image display monitor 4 is a wall-mountable LCD that can be used while mounted on a wall. The illumination sensor 1 is disposed on an upper portion of the image display monitor 4 to detect the illumination spectrum of the illumination light illuminating the image display monitor 4. Data relating to the illumination spectrum detected by the illumination sensor 1 are transmitted to a signal transceiver B52.

The signal transceiver B52 transmits the illumination spectrum data transmitted from the illumination sensor 1 to a signal transceiver A53 by wireless communication. The signal transceiver A53 transmits the received illumination spectrum data to the user request information input unit 11. In other words, in the color reproduction system according to the second embodiment, data relating to the illumination spectrum measured by the illumination sensor 1 are input into the user request information input unit 11 wirelessly.

The processing functions of the user request information input unit 11, request processing unit 12, result display processing unit 13, communication control unit 14, and data storage device 15 are identical to the processing functions of their counterparts shown in FIG. 1

Similarly to the color reproduction system according to the first embodiment, image data purchased by the user are transmitted from the server side system 200. These image data are subjected to predetermined color conversion processing on the basis of information relating to the illumination light illuminating the image display monitor 4, information relating to the color space (display characteristic) of the image display monitor 4, the spectral data of the imaging illumination light at the time of multi-spectrum image acquisition, and the spectral characteristic data of the imaging device. As a result of this color conversion processing, when an image of a painting is displayed on the image display monitor 4, for example, the image can be displayed in the same colors as the colors of the painting under the illumination illuminating the image display monitor 4. It should be noted that the image data transmitted from the server side system 200 are stored in an image data memory 51.

The illumination light illuminating the image display monitor 4 varies gradually according to the time of day. For example, outdoor light has an effect during the day, whereas at night, indoor lighting becomes dominant. Hence, the illumination sensor 1 preferably detects the illumination spectrum at arbitrary time intervals and transmits the detected illumination spectrum data to the server side system 200 as needed. In this case, color conversion processing based on the latest illumination spectrum data is performed in the server side system 200, whereupon the color conversion-processed image data are transmitted to the user side system 100A. As a result, an image corresponding to the latest illumination condition can be displayed on the image display monitor 4.

Further, the user may wish to change the image displayed on the image display monitor 4 appropriately. Therefore, measures may be taken to enable the user to change the painting weekly. In this case, the user request information input unit 11 transmits information relating to a painting indicated by the user to the server side system 200 weekly on the basis of an instruction from the user, whereupon the server side system 200 transmits the image data of the indicated painting to the user side system 100A. Thus, the image displayed on the image display monitor 4 can be changed such that one week a painting by Van Gogh is displayed and the following week a painting by Monet is displayed, for example.

According to the color reproduction system of the second embodiment, similarly to the color reproduction system of the first embodiment, image data of various color spaces can be provided without increasing the data volume of the server side system 200.

Further, the illumination sensor 1 is disposed on the upper portion of the image display monitor 4, and therefore the spectrum of the illumination light illuminating the image display monitor 4 can be detected with a high degree of precision.

Although the invention has been described above by reference to certain embodiments of the invention, the invention is not limited to the embodiments described above. Modifications and variations of the embodiments described above will occur to those skilled in the art, within the scope of the claims.

For example, in the first embodiment, the image display monitor 4 for displaying purchased image data is provided separately to the control monitor 3, but a single monitor may double as the control monitor 3 and the image display monitor 4.

In the first and second embodiments, an example in which the color reproduction system according to this invention is applied to an image data purchasing system was described, but this invention is not limited to an image data purchasing system, and may be applied to Web shopping, in which bags, clothes, and so on are ordered and purchased from a predetermined website, for example. In this case also, the user indicates the display characteristic of the image display monitor 4 and the rendering illumination light as color reproduction requirement information such that an image of an object captured under the desired rendering illumination light can be displayed on the image display monitor 4.

The entire contents of Japanese Patent Application P2007-299241 (filed on Nov. 19, 2007) are incorporated herein by reference.

What is claimed is:

1. A color reproduction system for displaying an image subjected to color conversion processing by a server side system on a monitor device of a user side system, wherein the user side system comprises:
an input unit for inputting color reproduction requirement information, which is information relating to a color reproduction requirement when the image is displayed on the monitor device; and
a user side communication unit for transmitting the color reproduction requirement information to the server side system via a network, and
the server side system comprises:
a first storage unit for storing a multi-spectrum image;
a second storage unit for storing color reproduction characteristic information, which is information relating to a color reproduction characteristic when the image is displayed on the monitor device;

a server side communication unit for receiving the color reproduction requirement information transmitted from the user side communication unit via the network; and a color conversion processing unit for obtaining, from the second storage unit, color reproduction characteristic information corresponding to the color reproduction requirement information received by the server side communication unit, and performing color conversion processing on the multi-spectrum image on the basis of the obtained color reproduction characteristic information.

2. The color reproduction system as defined in claim 1, wherein the color reproduction requirement information includes monitor characteristic information, which is information relating to a display characteristic of the monitor device, and information relating to a rendering illumination light.

3. The color reproduction system as defined in claim 2, wherein the input unit comprises a selection unit enabling a user to select any one of an imaging illumination light at the time of generation of the multi-spectrum image, a pre-existing illumination light, and an illumination light of a viewing environment of the monitor device as the rendering illumination light.

4. The color reproduction system as defined in claim 2, wherein the input unit selects and inputs the monitor characteristic information corresponding to the monitor device automatically from a plurality of sets of the monitor characteristic information.

5. The color reproduction system as defined in claim 2, wherein the user side system further comprises an illumination detection unit for detecting an illumination light of a viewing environment of the monitor device, and the input unit inputs the illumination light measured by the illumination detection unit as the rendering illumination light.

6. The color reproduction system as defined in claim 1, wherein the color reproduction characteristic information includes spectral data of an imaging illumination light at the time of generation of the multi-spectrum image, spectral characteristic data of an imaging device, monitor characteristic information relating to various monitor devices, and information relating to various rendering illumination light.

7. The color reproduction system as defined in claim 6, wherein the spectral data of the imaging illumination light and the spectral characteristic data of the imaging device included in the color reproduction characteristic information are stored in the multi-spectrum image.

8. A color reproduction device for performing color conversion processing on an image to be displayed on a monitor device of a user side system that can be connected via a network, comprising:

a first storage unit for storing a multi-spectrum image;

a second storage unit for storing color reproduction characteristic information, which is information relating to a color reproduction characteristic when the image is displayed on the monitor device;

an acquisition unit for obtaining color reproduction requirement information, which is information relating to a color reproduction requirement when the image is displayed on the monitor device, from the user side system via the network; and a color conversion processing unit for obtaining, from the second storage unit, color reproduction characteristic information corresponding to the color reproduction requirement information, and performing color conversion processing on the multi-spectrum image on the basis of the obtained color reproduction characteristic information;

wherein the color reproduction characteristic information includes spectral data of an imaging illumination light at the time of generation of the multi-spectrum image, spectral characteristic data of an imaging device, monitor characteristic information relating to various monitor devices, and information relating to various rendering illumination light.

9. The color reproduction device as defined in claim 8, wherein the color reproduction requirement information includes monitor characteristic information, which is information relating to a display characteristic of the monitor device, and information relating to a rendering illumination light.

10. The color reproduction device as defined in claim 9, wherein any one of an imaging illumination light at the time of generation of the multi-spectrum image, a pre-existing illumination light, and an illumination light of a viewing environment of the monitor device is selected by a user as the rendering illumination light.

11. The color reproduction device as defined in claim 8, wherein the spectral data of the imaging illumination light and the spectral characteristic data of the imaging device included in the color reproduction characteristic information are stored in the multi-spectrum image.

* * * * *